United States Patent
Hamann

[15] 3,673,933
[45] July 4, 1972

[54] OPTICAL SYSTEM FOR SUPERIMPOSING IMAGES

[72] Inventor: Omer F. Hamann, La Jolla, Calif.
[73] Assignee: Stromberg Datagraphix, Inc., San Diego, Calif.
[22] Filed: Aug. 3, 1970
[21] Appl. No.: 60,322

[52] U.S. Cl. ...................95/1.1, 95/12, 353/37, 353/81, 355/43, 355/65, 355/66
[51] Int. Cl. ...................................................G03b 15/10
[58] Field of Search ...............95/1.1, 12; 355/40, 43, 51, 355/65, 66; 353/37, 81

[56] References Cited

UNITED STATES PATENTS 3,473,451  10/1969  Greenly et al.....................355/40 X
3,495,267  2/1970  Brodie.............................95/1.1 X

*Primary Examiner*—Samuel S. Matthews
*Assistant Examiner*—Richard A. Wintercorn
*Attorney*—John R. Duncan

[57] ABSTRACT

An optical system for superimposing images on a single image plane from both directional and non-directional sources is disclosed. An apertured mirror is placed at an angle to a source of a diffused light image, to reflect light therefrom toward an image plane, such as a display screen or photosensitive sheet. A second, directional image is projected by an optical system through the aperture toward the image plane. A single objective lens assembly placed between the mirror and the image plane acts on light rays from both sources producing both images in superimposition in the image plane.

8 Claims, 2 Drawing Figures

INVENTOR.
OMER F. HAMANN
ATTORNEY

OPTICAL SYSTEM FOR SUPERIMPOSING IMAGES

BACKGROUND OF THE INVENTION

It is often desirable to superimpose light images from plural sources on a single image plane in many display and photographic applications. For example, in computer output microfilming applications the capability of simultaneously recording data from a cathode ray tube screen and a business form onto microfilm in superimposition is often useful. Also, in large screen display systems, it may be desirable to project a map background, a grid pattern overlay and data or radar images from a cathode ray tube on a display screen in superimposition.

Conventional image combining systems either project images along different, closely-spaced, axes or use a beam-splitter to permit projection of plural images along one axis.

However, where separate projection axes are used, image aberrations, such as keystoning and poor image superimposition occur. Beam-splitters use partially-reflecting or dichroic mirrors in the optical path between the plural light sources and the image plane. The beam-splitter is placed at an angle to the image plane. The image sources are arranged so that light forming one image passes through the beam-splitter to the image plane while the light forming the other image is reflected to the image plane. However, since the light from each source is partially transmitted and partially reflected, and partially absorbed in metallic mirrors, less than half of the available light reaches the image plane.

Dichroic beam-splitters are more effective where the sources emit light of different wavelengths and the light rays from each source strike the beam-splitter at a particular angle. Dichroic mirrors can be designed to transmit one wavelength range and reflect the other. However, they are less useful where both image sources emit in the same wavelength ranges. Where one or both images are in multiple colors, dichroic beam-splitters will distort the color rendition of the system.

Beam-splitters are fragile and susceptible to damage caused by vibration, cleaning and improper mounting. When thick beam-splitters are used aberrations are introduced since skew, saggital and tangental components of light emission have different optical path lengths. Beam-splitters are difficult to construct to the desired degree of flatness without increasing the thickness to the point where such aberrations become virtually impossible to correct.

Thus, there is a continuing need for improved optical systems for superimposing images from a plurality of sources in register on a simple image plane.

SUMMARY OF THE INVENTION

It is, therefore, an object of this invention to provide an optical system for superimposing images which overcomes the above-noted problems.

Another object of this invention is to provide an optical system for superimposing images which utilizes more of the available light without introducing optical aberrations.

Still another object of this invention is to provide an image superimposing optical system of improved simplicity and reliability.

The above objects, and others, are accomplished in accordance with this invention by an optical image superimposing system utilizing a reflector with an on-axis aperture to permit plural images to be directed along a single optical axis to a single image plane.

This system permits light rays from two or more image sources to have a common optical axis and a common image plane, which may typically be a display screen or a photosensitive surface. A directional image, such as one from a conventional transparency projector, may be combined with one or more non-directional images from diffuse sources such as cathode ray tube screens. This system eliminates optical problems caused by multiple off-axis projectors without introducing the many problems inherent in the use of beam-splitters or dichroic mirrors.

BRIEF DESCRIPTION OF THE DRAWING

Details of the invention, and a preferred embodiment thereof, will be further understood upon reference to the drawing, wherein.

DETAILED DESCRIPTION OF THE INVENTION

Figure 1:
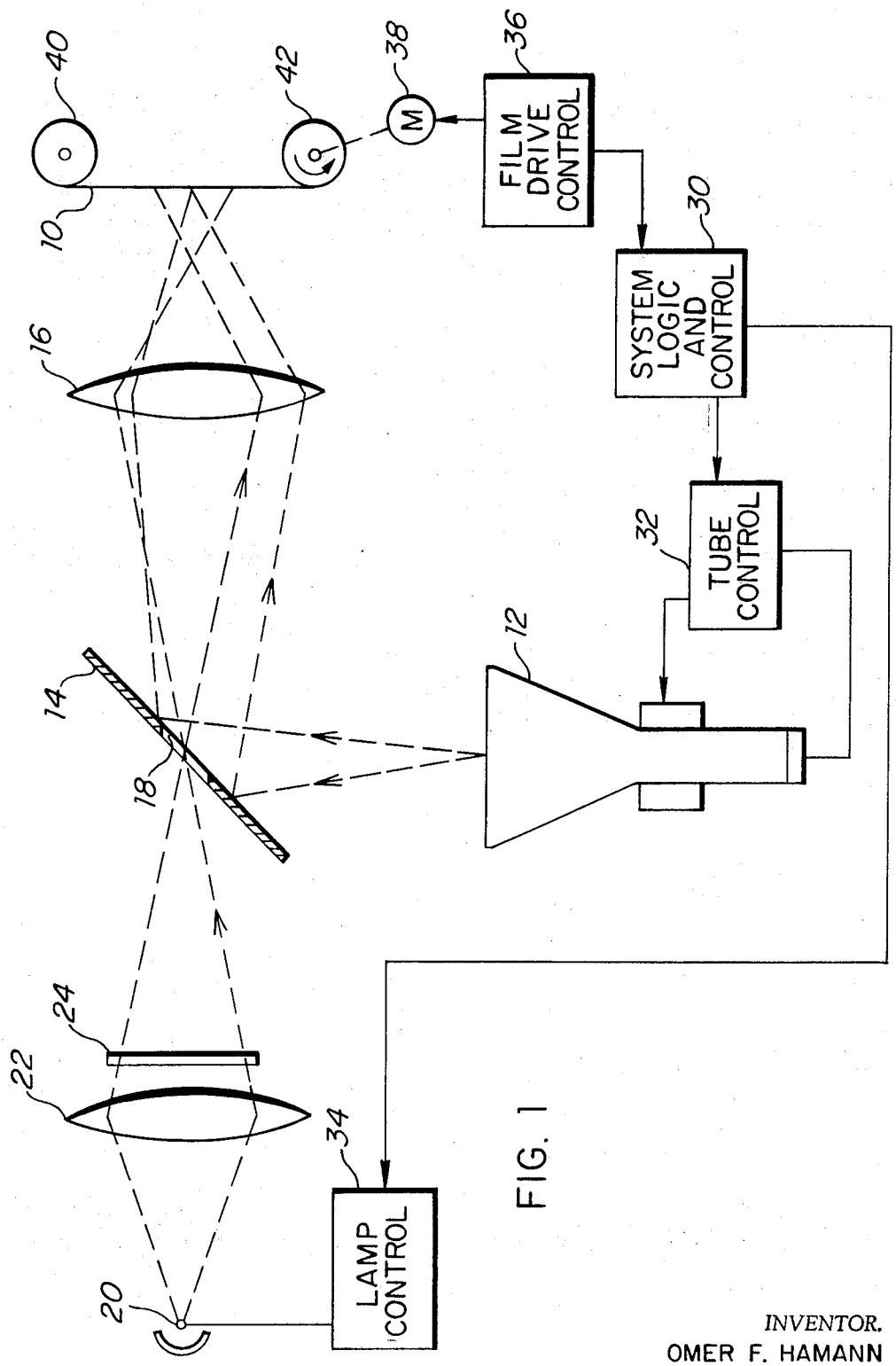
FIG. 1 shows a schematic representation of an optical system for superimposing images.

Referring now to FIG. 1, there is seen a schematic representation of a computer output microfilming system using the optical system of this invention. In such a microfilming system, it is desired to produce superimposed latent images in microfilm 10 from both data displayed on the screen of cathode ray tube 12 and business form slide 24.

Mirror 14 is arranged to reflect light from tube 12 through objective lens system 16 to microfilm 10. An aperture 18 in mirror 14 permits light from light source 20 to also reach microfilm 10. Aperture 18 preferably has an elliptical shape, so that it will appear circular when viewed along the optical axis through the aperture. Source 20 is approximately a point source, which is imaged by lens 22 in a vertical plane passing through the center of aperture 18. Thus, light passing from source 20 through form slide 24 substantially entirely passes through aperture 18 to lens 16 which projects an image of the slide on the microfilm.

Aperture 18 may be relatively small without appreciably decreasing the brightness of the form slide image. Since the area of aperture 12 is relatively small compared to the area of mirror 14, relatively little of the light reaching mirror 14 from tube 12 is lost through the aperture. The preferred size of aperture 18 will depend upon the size of light source 20, the magnification between the vertical planes through light source 20 and through aperture 18 and the spatial frequencies in form slide 24. Generally, an aperture size just sufficient to pass the significant portion of the zero order diffraction pattern of form slide 24 is preferred.

Mirror 14 may comprise any suitable material. A highly reflective metal mirror is preferred, since such a mirror is strong and may be manufactured to a high degree of flatness. Such a mirror can be cleaned with little fear of damage.

Lens 16 and 22 may comprise any suitable lens systems, and any suitable cathode ray tube, such as a shaped beam tube, may be used as tube 12.

In operation, the entire system is operated and controlled by a conventional system logic and control means 30. Typically, control means 30 may receive information from a computer tape reader and, through tube control 32, cause an image of the information to appear on the face of tube 12. The system logic and control circuits activate lamp control 34 to flash an image of slide 20 onto microfilm 10 when required. After each microfilm frame is exposed, system control 30 causes film drive control 36 to activate film drive motor 38 to advance one frame of film from supply reel 40 toward take-up reel 42. These operations are continued at high speed to sequentially record information on the microfilm.

Of course, this optical system is capable of projecting many different types of information on other surfaces. For example, forms slide 20 might project a map image onto a projection screen in place of microfilm 10, and tube 12 might provide both radar and data images in superimposition.

Figure 2:
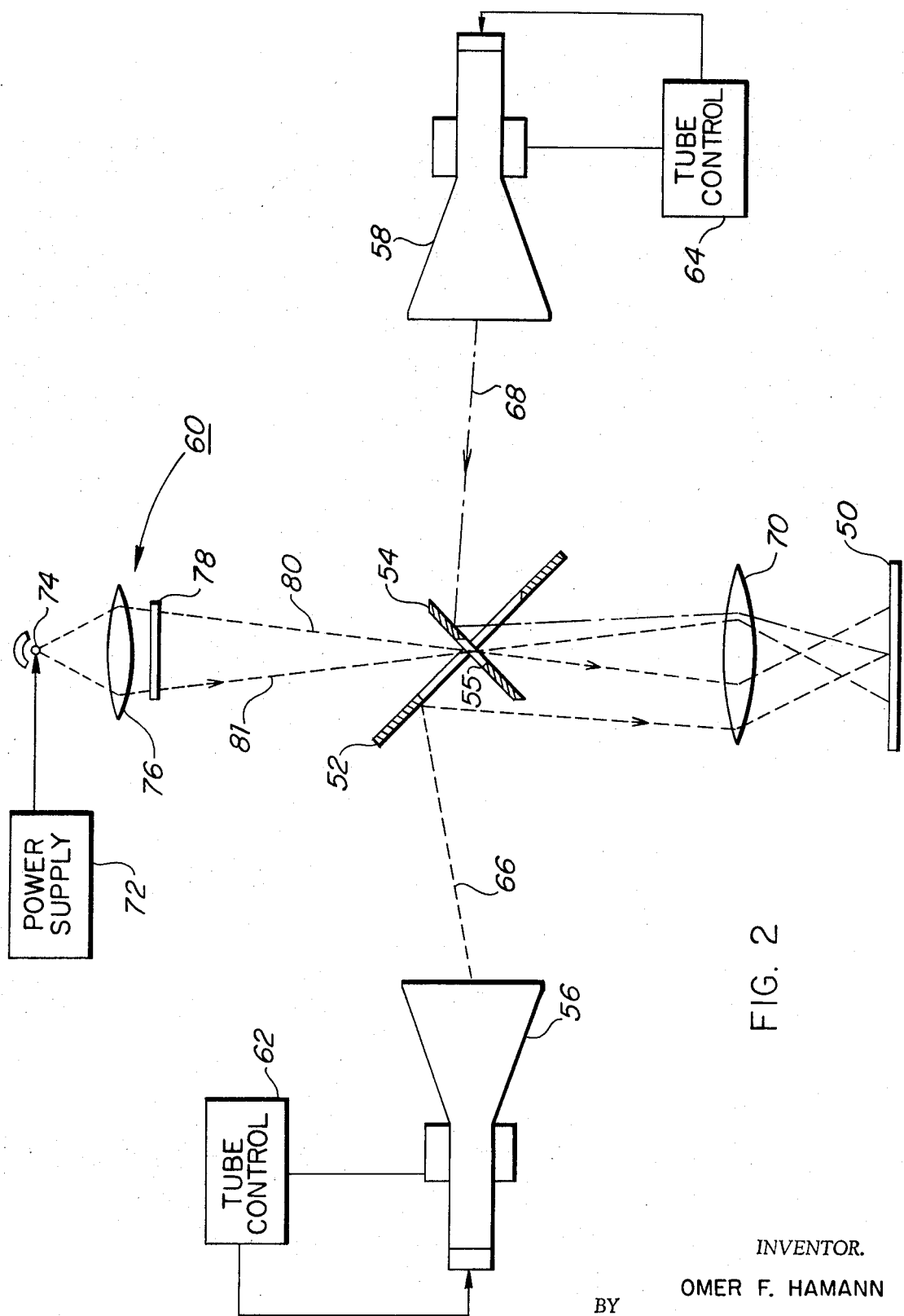
FIG. 2 shows a schematic representation of an alternative embodiment for superimposing images.

An alternative embodiment in which two diffuse images are combined with a directional image is shown in FIG. 2. In this embodiment, the images are presented on a display screen 50, which may be a front or rear projection screen.

A pair of apertured reflecting surfaces 52 and 54 are arranged to direct light from cathode ray tubes 56 and 58, respectively, toward screen 50.

Reflector 54 has an aperture 55 at the center located on the optical axis between a projection system 60 and screen 50. The aperture 55 is preferably elliptical in shape so that it will appear circular when viewed along that optical axis. The outer shape of reflector 54 is also preferably elliptical, so that it will appear circular when viewed from the position of tube 58. However, it is less important that the outer edge of reflector 54 be elliptical than it is that aperture 55 be elliptical, to give a circular boundary around the projector optical axis. The shape of aperture 53 within reflector 52 will correspond to the outer shape of reflector 54.

In operation, light-and-shadow images will be produced on the faces of tubes 56 and 58 by conventional tube control means 62 and 64, respectively. Typical light rays 66 and 68 illustrate the path of light from the tubes, to reflectors 52 and 54, and through lens 70 to screen 50. Typically, one tube might present radar images, while the other provides alphanumeric data or graphical images. Meanwhile, power supply 72 is operated to activate light source 74 to direct light through lens system 76 and partially transparent slide 78. This light passes through aperture 55 and lens 70 to screen 50, as illustrated by typical light rays 80 and 81. Typically, projection system 60 might provide a map or grid background on screen 50.

While reflectors 52 and 54 and aperture 55 may have any suitable sizes and shapes, it is preferred that aperture 55 have a size sufficient to pass the significant portion of the zero order diffraction pattern of slide 78, as discussed above. The sizes of the reflectors and the distance between the tube faces and the reflectors may be adjusted to give optimum image uniformity and brightness.

While various specific components, arrangements and proportions have been described in conjunction with the above description of preferred embodiments, these can be varied or other components used, where suitable, with similar results as discussed above.

Further applications and modifications of the present invention will become apparent to one skilled in the art upon reading this disclosure. These are intended to come within the scope of this invention, as defined in the appended claims.

I claim:

1. An optical system comprising:
   a. a first imaging means including a substantially planar diffuse, non-directional, light-and-shadow image source;
   b. an apertured reflecting surface positioned at an angle to the plane of said first image source to reflect light emitted thereby said reflecting surface being substantially totally reflecting;
   c. a lens system positioned to receive light reflected by said apertured reflecting surface and to form an image therefrom on an image plane; and
   d. a second imaging means positioned to project light from a directional image source through the aperture in said apertured reflecting surface, and through said lens system to form a second image in superimposed register with said first image on said image plane.

2. The optical system according to claim 1 wherein said first imaging means includes a cathode ray tube screen, said second imaging means includes a transparency projection system and said image plane includes a sheet of photosensitive material.

3. The optical system according to claim 2 wherein said aperture has a size just sufficient to pass the significant portion of the zero order diffraction pattern of the transparency used in said transparency projection system.

4. An optical system comprising:
   a. first and second spaced imaging means, each including a substantially planar, diffuse, non-directional, light-and-shadow image source;
   b. a first apertured substantially totally reflecting surface arranged at an angle to the plane of said first image source to reflect light emitted thereby along an optical axis;
   c. a second apertured substantially totally reflecting surface positioned within the aperture in said first reflecting surface, arranged at an angle to the plane of said second image source to reflect light emitted thereby along said optical axis;
   d. a third imaging means positioned to project light from a directional image source through the aperture in said second apertured reflecting surface along said optical axis; and
   e. a lens system positioned along said optical axis receiving light from each imaging means to form images in superimposed register in a single image plane.

5. The optical system according to claim 4 wherein said first and second imaging means each includes a cathode ray tube screen, said third imaging means includes a transparency projection system and said image plane includes a sheet of photosensitive material.

6. The optical system according to claim 5 wherein said aperture in said second reflecting surface has a size just sufficient to pass the significant portion of the zero order diffraction pattern of the transparency used in said transparency projection system.

7. An optical system comprising:
   a. a cathode ray tube imaging means for forming a diffuse, non-directional, light-and-shadow image on the face thereof;
   b. an apertured substantially totally reflecting surface positioned at an angle to said face to reflect light emitted thereby;
   c. a lens system positioned to receive light reflected by said apertured reflecting surface and to form first image on an image plane corresponding to that on said face; and
   d. a transparency projection means for projecting a directional image of a partially transparent original light-and-shadow image through the aperture in said reflecting surface and through said lens system; whereby a second image is formed on said image plane in superimposed register with said first image.

8. The optical system according to claim 7 wherein said aperture has a size just sufficient to pass the significant portion of the zero order diffraction pattern of the transparency used in said transparency projection system.

* * * * *